United States Patent Office 2,936,228
Patented May 10, 1960

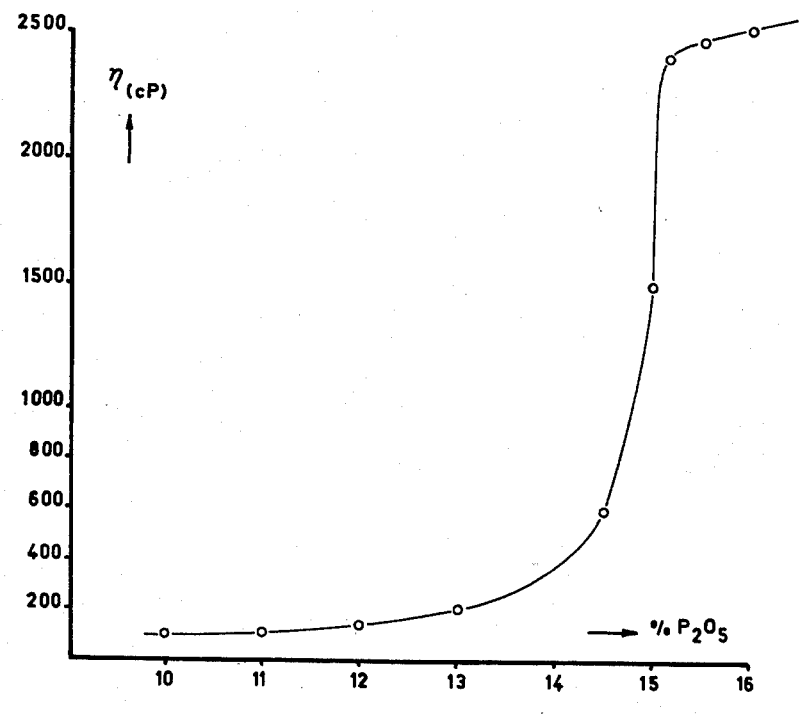

2,936,228
PROCESS OF PREPARING COMPOUND FERTILIZER

Pieter J. van den Berg, Sittard, Netherlands, assignor to Stamicarbon N.V., Heerlen, Netherlands Application December 9, 1957, Serial No. 701,447

Claims priority, application Netherlands December 11, 1956

3 Claims. (Cl. 71—43)

A well known process of preparing a compound fertilizer containing nitrate of ammonia and dicalcium phosphate comprises the steps of decomposing phosphate rock with enough nitric acid to give a calcium nitrate-phosphoric acid mixture, cooling the mixture, thereafter removing therefrom enough calcium by crystallization of calcium nitrate that there is left an acid solution with a molar $CaO/P_2O_5$ ratio of say 1.6–2.6, subsequently neutralizing the solution with $NH_3$, concentrating it by evaporation and converting the resulting melt—after addition of potassium salts, if desired—to a granular product.

To lower the cost of crystallizing the calcium nitrate, the decomposition of the phosphate rock is preferably carried out with a fairly concentrated nitric acid, e.g. nitric acid containing in excess of 50% by weight of $HNO_3$. This procedure is used because at a high nitrate ion concentration, the acid solution will be more quickly saturated with calcium nitrate and, therefore, need not be cooled excessively to effect the crystallization of the desired amount of calcium nitrate. However, the concentration of the nitric acid must not be higher than about 65% because, otherwise, it is difficult to centrifuge the suspension of calcium nitrate crystals in the mother liquor obtained after cooling.

The use of nitric acid containing 54–59% by weight of $HNO_3$ has been found very useful. It has been found, however, that the use of nitric acid of this concentration often gives rise to difficulties in the succeeding stages of the process because, during the neutralization with $NH_3$ and the evaporation stage, the viscosity of the mass tends to become very high with the result that the capacity of the evaporating plant is considerably decreased.

This undesired increase in viscosity occurs only when sedimentary phosphates such as Kouribgha, Florida pebble or Egyptian phosphates are treated.

In treating phosphates of volcanic origin, e.g. Kola phosphate, these troubles were not experienced.

The tendency to a high viscosity of the melt—which in fact is a suspension of dicalcium phosphate in molten nitrate of ammonia—seems to be related to the content of clay and organic components which occur in sedimentary phosphates but which are absent in phosphates of volcanic origin. These clay and organic components affect to such an extent the crystal structure of the calcium phosphate precipitated during the neutralization with $NH_3$, that there are obtained crystals possessing a needle-like instead of a rounded form. This needle-like shape of the calcium phosphate crystals is the cause of the undesirably high increase in viscosity of the mass during evaporation.

The above theory was confirmed by the observation that, if the clay and organic components be removed as completely as possible from the sedimentary phosphates prior to the neutralization of the decomposition liquor, then, an undesirably high increase in viscosity is not noted during the evaporation stage. However, preliminary elimination of the clay and organic components is not possible in practice owing to the high cost involved.

Applicant has discovered that the undesirably high increase in viscosity during evaporation may be obviated if, prior to neutralization, the decomposition liquor to be neutralized is slightly diluted by the addition of water or nitric acid, preferably, to such a degree as to lower the $P_2O_5$ content to below 15% by weight. Dilution to a concentration lower than 12% by weight is completely unnecessary as well as costly, since all the water added has to be again removed by evaporation.

The single graph on the drawing attached to this specification shows the relationship between the viscosity $\eta$ (C.P.) of the suspension after evaporation (temperature 150° C., water content 4%), and the $P_2O_5$ content in the original unneutralized decomposition liquor ($CaO/P_2O_5=1.7$).

It can be seen from that graph that when the $P_2O_5$ content is above 13%, the viscosity tends to increase rapidly.

To further explain the present invention, there are given below several examples describing the preparation of fertilizers from sedimentary phosphates according to the process of the present invention.

Example I

Kouribgha phosphate (51.5% CaO, 33.5% $P_2O_5$, 4.0% $CO_2$, 4.5% F) was decomposed with 55% nitric acid at 80° C.

By adding 2474 g. nitric acid for every 1000 g. phosphate rock, a solution with a molar N/CaO ratio of 2.35 and a molar $CaO/P_2O_5$ ratio of 3.9 was obtained in one hour.

By cooling the solution to 11° C., 1230 g. calcium nitrate tetrahydrate were crystallized out and were subsequently removed by centrifuging. The molar $CaO/P_2O_5$ ratio in the remaining acid mother liquor was lowered thereby to 1.7 and the molar N/CaO ratio to 2.8. The percentage of dissolved $P_2O_5$ in the parent liquor amounted to 15.0%. Thereupon, the mother liquor was diluted by adding thereto 344 g. of water which brought the $P_2O_5$ content down to 13.0%. Next, the acid mother liquor was neutralized continuously with $NH_3$ (230 g. per 1000 g. of phosphate rock) at a pH of 2.5 and the resulting suspension was concentrated in an evaporator yielding a melt (1725 g.) which, by granulation, was made into a granular fertilizer containing 19.4% $P_2O_5$ and 20.1% N. Using a circulation-type of evaporator, 6.25 tons of final product were obtained hourly. When the mother liquor was not diluted prior to the neutralization with $NH_3$, it was impossible to concentrate the suspension in the above mentioned evaporator.

Example II

In dissolving Florida pebble phosphate (50% CaO, 35% $P_2O_5$, 2.6% $CO_2$, 3.8% F), 2142 g. nitric acid containing 65% by weight of $NH_3$ were used for every 1000 g. phosphate rock.

The resulting solution (N/CaO=2.46, $CaO/P_2O_5=$ 3.62) was cooled down to 17° C., enabling 780 g. calcium nitrate tetrahydrate to be removed by centrifuging. The remaining acid mother liquor (N/CaO=2.72 and $CaO/P_2O_5=2.28$) contained 14.8% $P_2O_5$. By adding 330 g. water, the $P_2O_5$ content was first lowered to 13.0%, after which the customary neutralization with 270 g. $NH_3$ was carried out in a continuous manner at a pH of 2.3.

Evaporation of the solution, followed by granulation of the melt, gave 2000 g. final product, containing 22% N and 18.1% $P_2O_5$ for every 1000 g. rock phosphate.

Here again, the handling of the neutralized mass in the evaporator, without previous dilution, was found to be impossible.

Example III

Kouribgha phosphate of the same composition as mentioned in Example I was decomposed with 54% nitric acid, yielding a solution with a molar N/CaO ratio=2.0 and a molar $CaO/P_2O_5$ ratio=3.9. 2150 g. nitric acid were used for every 1000 g. phosphate rock.

By cooling down to 14° C. and subsequent crystallization, 1222 g. calcium nitrate tetrahydrate were removed, the remaining acid mother liquor having an N/CaO ratio of 2.0 and a $CaO/P_2O_5$ ratio of 1.7. The $P_2O_5$ content of this mother liquor was 17.4%. By the addition of 470 g. nitric acid (42% by weight $HNO_3$) and 85 g. water, the N/CaO ratio was adjusted to 2.8 and the $P_2O_5$ content to 13.5%. Thereupon, the mass was neutralized in the manner described in Examples I and II—using 230 g. $NH_3$ per 1000 g. phosphate rock—evaporated, and finally granulated to give a final product containing 20% $P_2O_5$ and 20% N.

Without previous dilution, the mass became so viscous during the evaporation stage that hardly any circulation, and consequently, insufficient evaporation, was obtained in the evaporator.

As disclosed above, the evaporation of the neutralized liquor is preferably carried out in a circulation type of evaporator, i.e. one in which the liquor to be evaporated is circulated by any suitable means inside the evaporator over the heating surfaces.

I claim:

1. In the process of preparing a compound fertilizer containing nitrate of ammonia and dicalcium phosphate from sedimentary phosphates which comprises the steps of, decomposing said phosphate with nitric acid containing 50-65% (by weight) nitric acid to yield a calcium nitrate-phosphoric acid solution, removing a portion of said calcium nitrate to leave an acid liquor with a molar $CaO/P_2O_5$ ratio of 1.6-2.6 and with a $P_2O_5$ content greater than about 15% by weight, neutralizing said liquor with $NH_3$ and evaporating the neutralized liquor to produce a melt of said compound fertilizer, the improvement of advantageously inhibiting a detrimental substantial increase in viscosity of the liquor during the neutralization and evaporation steps which consists in: combining with said process the step of diluting prior to the neutralization step, the acid liquor with at least one of the liquids selected from the group consisting of water and nitric acid to reduce the $P_2O_5$ content of the liquor to less than 15% by weight.

2. Process according to claim 1, wherein the neutralized liquor is circulated while being evaporated, and the resulting melt is granulated.

3. Process according to claim 1, wherein the portion of the calcium nitrate is removed by crystallization, and the mother liquor is diluted to a $P_2O_5$ content within the range of 13-14% by weight.

References Cited in the file of this patent
UNITED STATES PATENTS

| | | |
|---|---|---|
| 1,758,448 | Liljenroth | May 13, 1930 |
| 1,859,738 | Johnson | May 24, 1932 |
| 1,876,501 | Johnson | Sept. 6, 1932 |
| 1,903,684 | Palazzo | Apr. 11, 1933 |